(12) United States Patent
Zhang et al.

(10) Patent No.: US 9,540,710 B2
(45) Date of Patent: Jan. 10, 2017

(54) METHOD OF PURIFYING SODIUM METAL

(71) Applicant: Guizhou Province Product Quality Supervision and Inspection Institute, Guiyang (Guizhou Province) (CN)

(72) Inventors: Jiangang Zhang, Guiyang (CN); Wenlong Gao, Guiyang (CN); Xu Cao, Guiyang (CN); Chunyin Huang, Guiyang (CN); Shaoyin Iiu, Guiyang (CN); Yongyu Feng, Guiyang (CN)

(73) Assignee: GUIZHOU PROVINCE PRODUCT QUALITY SUPERVISION AND INSPECTION INSTITUTE, Guiyang (CN)

( * ) Notice: Subject to any disclaimer, the term of this patent is extended or adjusted under 35 U.S.C. 154(b) by 96 days.

(21) Appl. No.: 14/550,914

(22) Filed: Nov. 22, 2014

(65) Prior Publication Data

US 2015/0232964 A1 Aug. 20, 2015

(30) Foreign Application Priority Data

Feb. 20, 2014 (CN) .......................... 2014 1 0057316

(51) Int. Cl.
  *C22B 9/02* (2006.01)
  *C22B 9/04* (2006.01)
  (Continued)

(52) U.S. Cl.
  CPC ................. *C22B 26/10* (2013.01); *C22B 9/02* (2013.01); *C22B 9/04* (2013.01); *C22B 9/05* (2013.01);
  (Continued)

(58) Field of Classification Search
  CPC .............. C22B 26/10; C22B 9/04; C22B 9/02; C22B 9/05; F27D 7/02; F27D 7/06; F27D 2007/066; F27B 14/04; F27B 2014/045
  See application file for complete search history.

(56) References Cited

U.S. PATENT DOCUMENTS

| 1,814,072 | A | * | 7/1931 | Bakken | ..................... C22B 9/02 75/590 |
| 2,276,239 | A | * | 3/1942 | Nelson | ..................... C22B 26/22 75/409 |
| 2012/0034571 | A1 | * | 2/2012 | Garrison | ................. C10B 47/46 432/210 |

FOREIGN PATENT DOCUMENTS

| CN | 103480168 A | * | 1/2014 |
| CN | 203668481 U | * | 6/2014 |

(Continued)

OTHER PUBLICATIONS

Li Wensheng et al. CN 103409648 B published Sep. 2014. Machine translation.*

(Continued)

*Primary Examiner* — George Wyszomierski
*Assistant Examiner* — Tima M McGuthry Banks
(74) *Attorney, Agent, or Firm* — Wayne & King LLC

(57) ABSTRACT

An apparatus for purifying sodium metal including: a top flange, a transparent slice, a hollow flange, a vacuum distillation kettle, gaskets, and bolts. With this apparatus, solid sodium is liquefied by heating. The volatile impurities contained in the liquid sodium metal evaporate out of the vacuum pump. After heating the liquid sodium to a high temperature, circulating cooling water is added to the condenser tube by radiation-auxiliary distillation. High-purity argon is then added to remove volatile impurities, and thermal radiation is performed to accelerate the evaporation rate at the surface of the liquid sodium. Consequently, gaseous sodium rapidly condenses on the condenser tube and becomes solid sodium.

3 Claims, 4 Drawing Sheets

(51) Int. Cl.
C22B 9/05 (2006.01)
C22B 26/10 (2006.01)
F27D 7/02 (2006.01)
F27B 14/04 (2006.01)
F27D 7/06 (2006.01)

(52) U.S. Cl.
CPC .............. *F27B 14/04* (2013.01); *F27D 7/02* (2013.01); *F27D 7/06* (2013.01); *Y02P 10/234* (2015.11)

(56) References Cited

FOREIGN PATENT DOCUMENTS

CN 103409648 B * 9/2014
KR 20110134135 A * 12/2011

OTHER PUBLICATIONS

Zhao Zhiwei et al. CN 203668481 U published Jun. 2014. Machine translation.*

Lee Han Soo et al. KR 201110134135 A published Dec. 2011. Machine translation.*

* cited by examiner

METHOD OF PURIFYING SODIUM METAL

CROSS-REFERENCE TO RELATED APPLICATIONS

This application is a continuation of, and claims priority to, Chinese Patent Application No. 201410057316.4 with a filing date of Feb. 20, 2014. The content of the aforementioned application, including any intervening amendments thereto, is incorporated herein by reference.

FIELD OF THE INVENTION

This invention relates to an apparatus and a method to purify sodium metal by thermal radiation-auxiliary distillation.

BACKGROUND OF THE INVENTION

Sodium is one of the most widely distributed Earth elements. Sodium weight accounts for approximately 2.83% ($6^{th}$ in rank) of the total weight of the Earth's crust. Sodium metal is active and has low melting point, high boiling point, and good thermal and electrical conductivities. This metal has a wide range of applications. Sodium cyanide, triphenylphosphine, sodium borohydride, sodium azide, sodium methylate, sodium ethoxide, sodium peroxide, sodium amide, sodium hydride, and other compounds are being commercially manufactured. They are used in metallurgy, pharmaceuticals, pesticides, printing, and dyeing. In the metallurgical industry, they are as a reducing agent in the preparation of titanium, zirconium, silicon, etc. Given its active chemical nature, sodium metal is difficult to purify.

Most purification methods of sodium currently use industrial sodium as raw material. Chemical, cold trap, distillation, and filtration methods are also used in the purification. However, the process and reaction times are considerably long. Vacuum distillation is a commonly used method to purify a low-melting point metal. The liquid saturation vapor pressure reduces under a negative pressure. Consequently, the boiling point also reduces, as well as the energy consumption. The liquid remains in a boiling state in vacuum distillation. Metal impurity is due to the strong convection inside the fluid, which is brought to the surface and forms fog particles that affect the purification. Recent research and applications of distillation-purification technology are about sub-boiling distillation. In addition, no technological innovation has used sub-boiling distillation to purify sodium metal.

SUMMARY OF THE INVENTION

This invention aims to provide a method to purify sodium metal by a sub-boiling distillation technology. This technology uses thermal radiation and vacuum distillation to prevent the boiling state of vacuum distillation from forming fog particles with main metal and impurities to escape in normal conditions, thereby improving purification efficiency.

The sub-boiling distillation technology mainly uses thermal radiation to heat liquid surface to keep the liquid temperature below the boiling point temperature and make it be evaporated, condensed, and purified. Liquid metal is heated at a temperature range of 5° C. to 20° C. below its boiling point to be purified. Given that the liquid metal does not reach the boiling point, the gas that balances with the liquid has decreased steamy fog particles and balances with the liquid in the molecular state. Consequently, impurity particles in the steam are reduced, resulting in significant purification effect and high efficiency.

A sodium metal purification apparatus is used. The apparatus includes a top flange, a transparent slice, a hollow flange, a vacuum distillation kettle, gaskets, and bolts. The transparent slice is located between the top flange and the hollow flange, with the vacuum distillation kettle under them. The top flange, transparent slice, hollow flange, and vacuum distillation kettle are fastened by bolts. With the gasket sealing every component, a closed whole is formed. With this apparatus, solid sodium is heated to liquid sodium. The volatile impurities contained in the liquid metal sodium evaporate out of the vacuum pump. After heating the liquid sodium to a high temperature, circulating cooling water is added to the condenser tube. A radiation-auxiliary distillation is provided. High-purity argon is also added to remove volatile impurities, and thermal radiation is performed to accelerate the evaporation rate at surface temperature of sodium. Consequently, gaseous sodium rapidly condenses on the condenser tube and becomes solid sodium. Thermal radiation-auxiliary distillation is finally realized to refine sodium metal.

The transparent slice of the purification apparatus allows thermal radiation to reach the surface of the heated liquid sodium metal in the kettle to vaporize the surface of the liquid sodium metal. The resultant material can be quartz, calcium fluoride, magnesium fluoride, transparent fluorine plastic, or corrosion-resistant glass.

The hollow flange comprises condensation water imports, condensation water exports, a suction hole, and an air inlet. The cooling coil is located between the condensation water imports and the condensation water exports. The suction hole is attached through a one-way valve connected to a vacuum pump. The air inlet is attached through the one-way valve with high-purity argon gas.

The technological conditions of heating the liquid sodium are as follows: the temperature is controlled at 200° C. to 280° C.; the vacuum degree is less than or equal to 10 Pa; the heating time is 2 h to 10 h. High purity argon is added to the apparatus twice or more to remove volatile impurities.

The heating furnace increases the temperature of the liquid sodium from 300° C. to 600° C. Thermal radiation-auxiliary distillation is then applied to purify sodium metal.

Compared with the existing vacuum distillation technology and equipment, the present invention firstly adopts the sub-boiling distillation principle that using thermal radiation and distilling to purify sodium metal and it leads to signification purification effect and high efficiency. The present invention makes the liquid surface of sodium metal be heated by radiation and make the liquid surface evaporate in molecular state under the conditions of not boiling. It will avoid the strong convection caused by boiling and make the liquid droplets contained impurities evaporate and condense so that the efficiency of distillation is improved. The present invention applies to the vacuum distillation purification of metal sodium and other low melting metal.

DETAILED DESCRIPTION OF THE INVENTION

The following combination of the accompanying drawings described the method of the invention.

Figure 1:
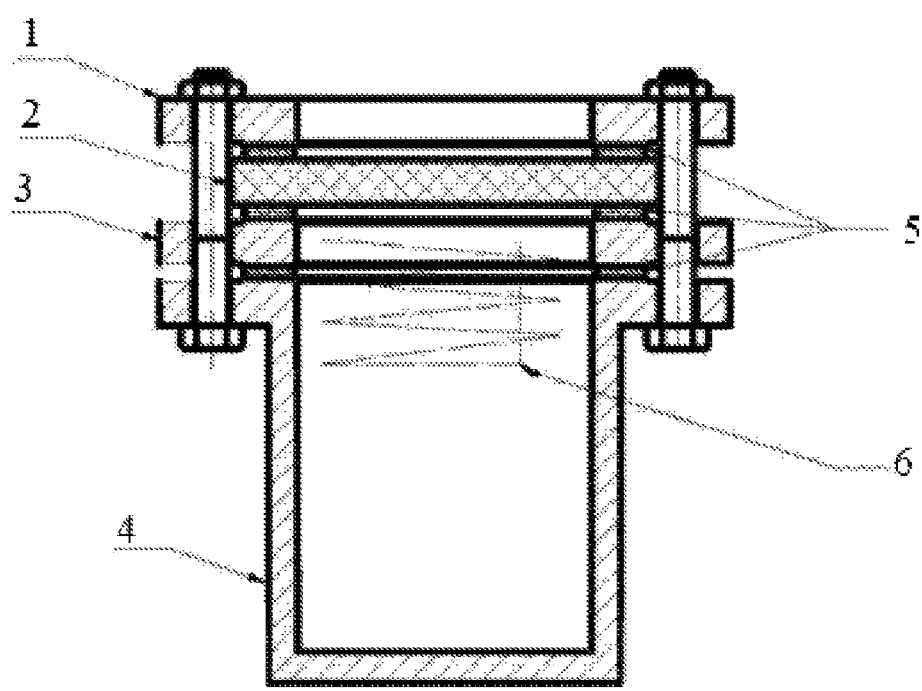
FIG. 1 shows a cross-sectional view of the apparatus of the present invention.
Figure 2:
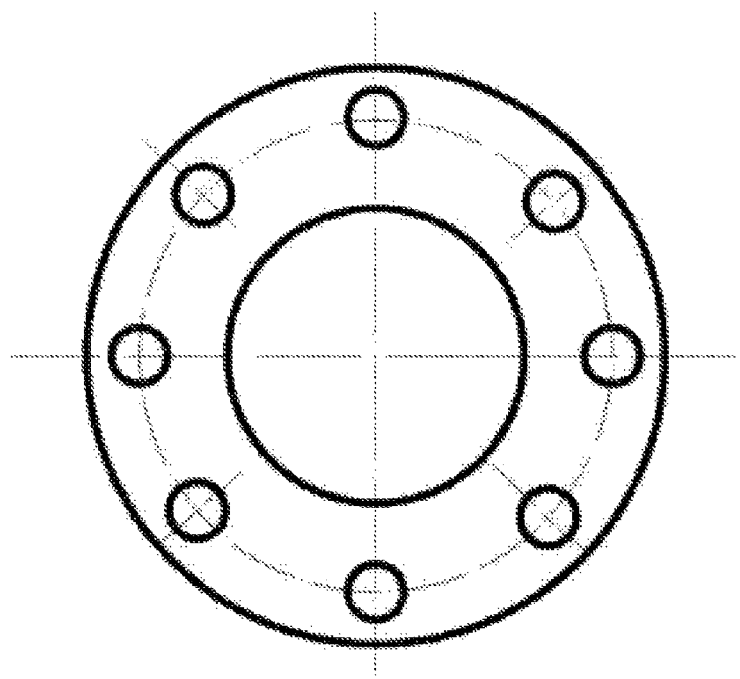
FIG. 2 shows a plan view of the top flange.
Figure 3:
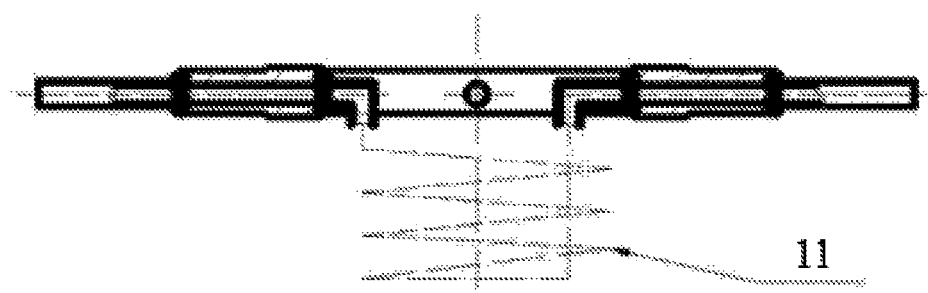
FIG. 3 shows a structure diagram of the hollow.
Figure 4:
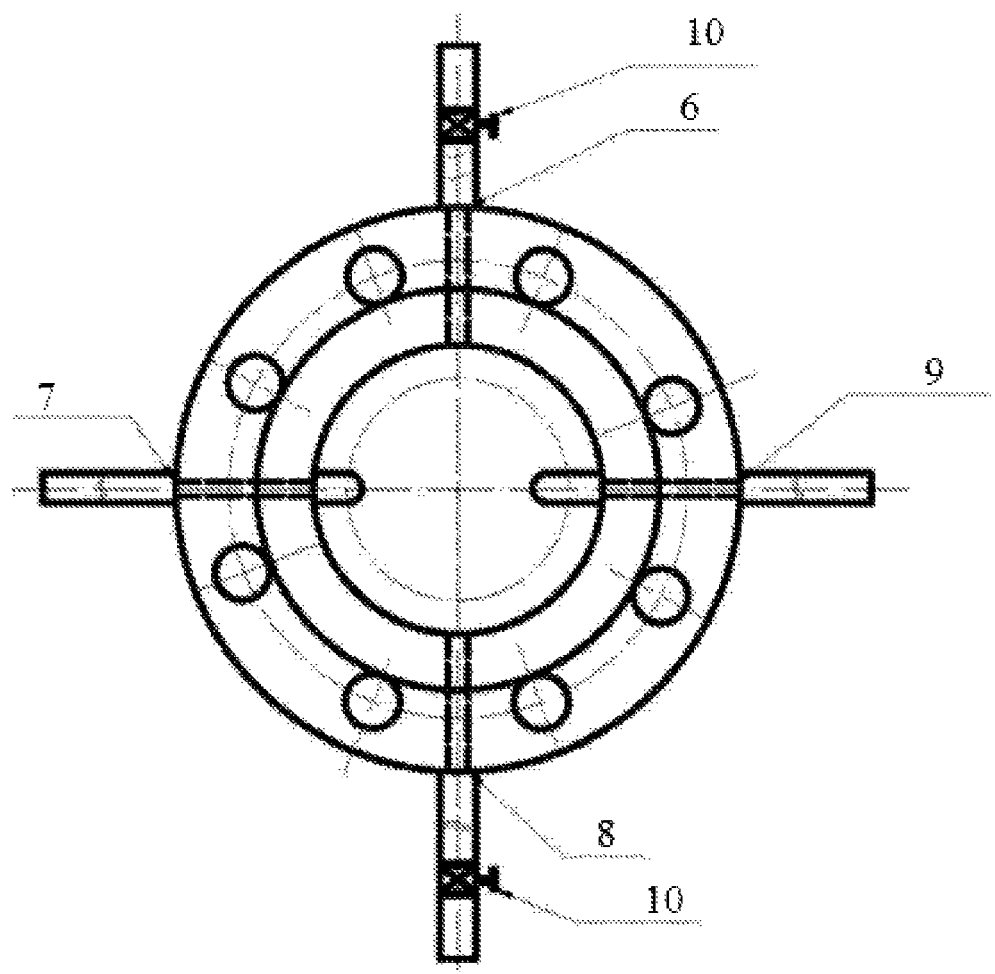
FIG. 4 shows a plan view of the hollow flange of the present invention.

Solid sodium metal (with 99.5% purity) as raw material is placed in the distillation kettle body 4, as shown in FIG. 1. The apparatus is placed on the heating furnace. 1 is a top flange, 2 is a transparent slice, 3 is a hollow flange, and 5 is gaskets. The hollow flange 3 comprises condensation water imports 7, condensation water exports 9, a suction hole 6, and an air inlet 8. The suction hole 6 is attached through a one-way valve 10 connected to a vacuum pump. The air inlet 8 entry is attached through the one-way valve 10 with high-purity argon gas. The converging tube is placed close to the conical surface of the transparent slice 2. The top of the converging tube has a set of infrared radiation lamps.

Figure 5:
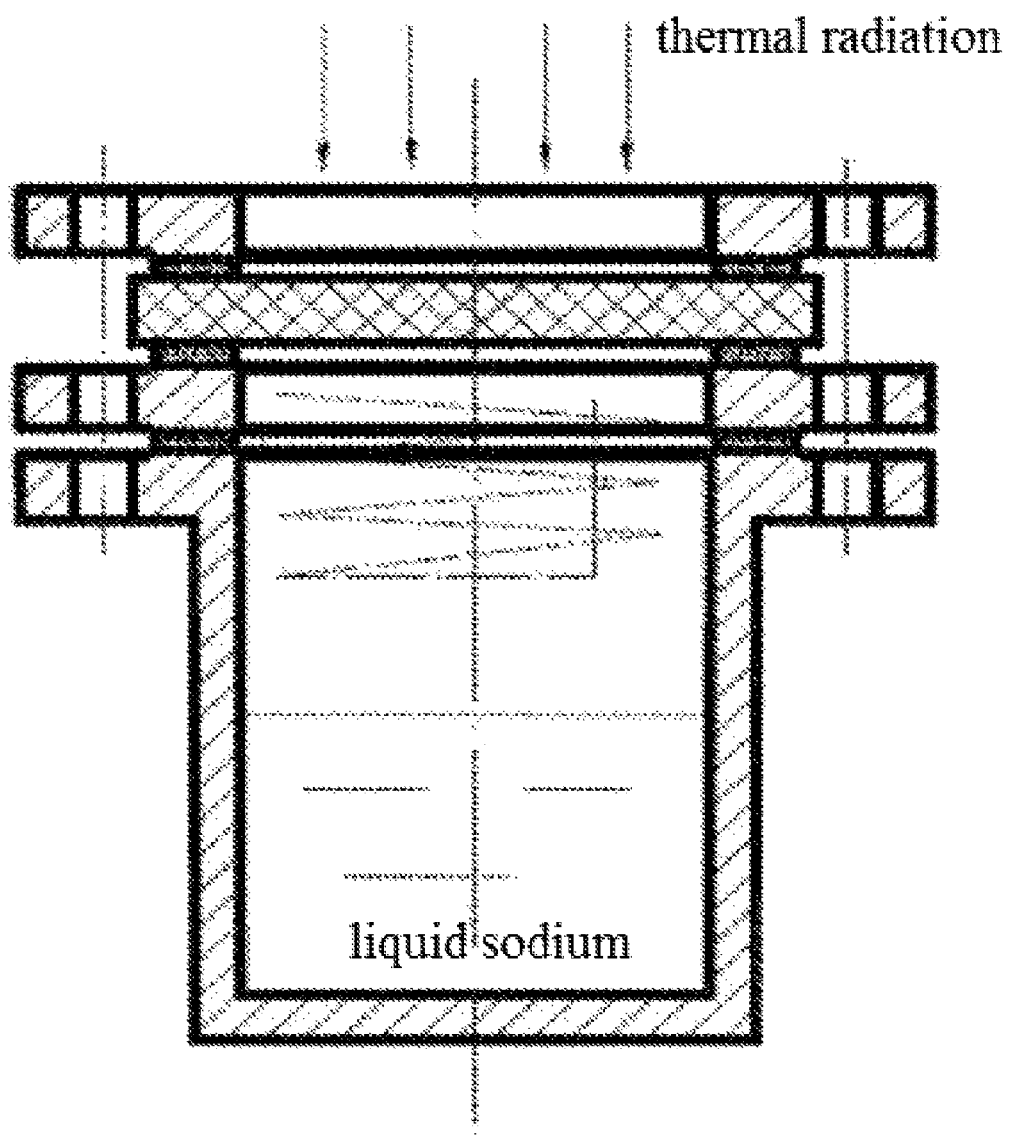
FIG. 5 shows a flow diagram of the method to purify the sodium.

The technological process is shown in FIG. 5.

First, an infrared radiation lamp is used to heat liquid sodium and control the temperature at 240° C. to 260° C. The vacuum degree is less than or equal to 10 Pa. The heating time is 2 h. High-purity argon is added twice to the apparatus to remove volatile impurities. Solid sodium is heated into liquid sodium. The volatile impurities contained in the liquid sodium metal are evaporated out of the vacuum pump.

Second, the apparatus is placed on a heating furnace to increase the temperature of liquid sodium to 400° C. Circulating cooling water is then added to the condenser tube by radiation-auxiliary distillation. Thermal radiation is used to accelerate the evaporation rate at surface temperature of sodium. Thus, gaseous sodium rapidly condenses on the condenser tube and becomes solid sodium. Thermal radiation-auxiliary distillation is finally realized to refine sodium metal.

The purification of sodium metal is determined by inductively coupled plasma optical emission spectrometry. The total impurity content is less than 0.01%.

We claim:

1. An apparatus for purifying a sodium metal, comprising:
a top flange; a transparent slice; a hollow flange; a vacuum distillation kettle; a plurality of gaskets; and a plurality of bolts;
wherein the top flange, the transparent slice, the hollow flange, and the vacuum distillation kettle are fastened by the plurality of bolts, with an order that the top flange is on the top, the transparent slice is located between the top flange and the hollow flange, and the vacuum distillation kettle is at the bottom; the plurality of gaskets are disposed between every two adjacent components to construct a sealed whole.

2. The apparatus according to claim 1, wherein the transparent slice is selected from the group consisting of quartz, calcium fluoride, magnesium fluoride, transparent fluorine plastic, and corrosion-resistant glass.

3. The apparatus according to claim 1, wherein the hollow flange further comprises at least one condensation water import, at least one condensation water export, a suction hole, and an air inlet; wherein a cooling coil is disposed between the condensation water import and the condensation water export; the suction hole is connected to a vacuum pump through a first one-way valve; the air inlet is connected to a high-purity argon tank through a second one-way valve.

* * * * *